June 3, 1941.  L. L. SCHAUER  2,244,026
RADIAL DRILL
Filed Dec. 10, 1937  3 Sheets-Sheet 1
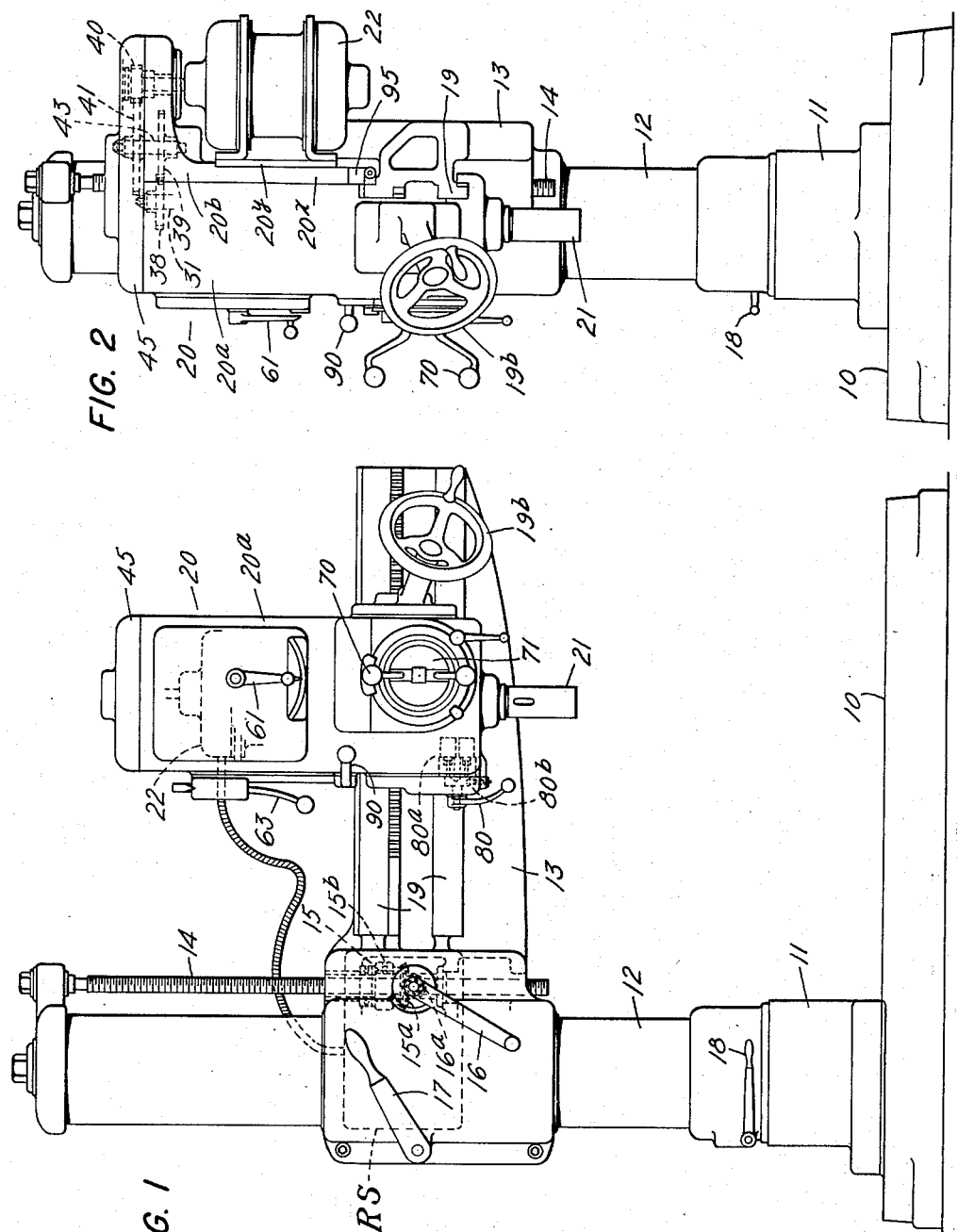
INVENTOR
Lawrence Lee Schauer
BY
Albert F. Nathan
ATTORNEY

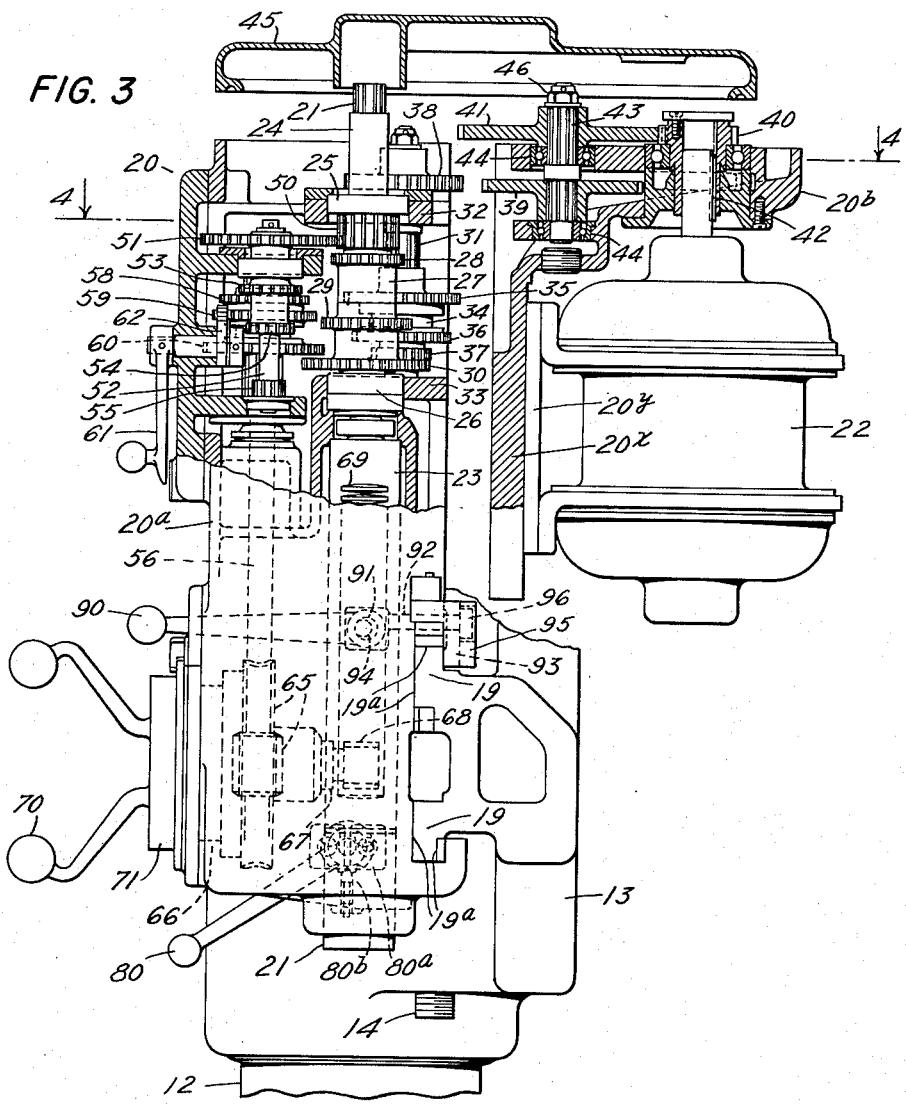

June 3, 1941.  L. L. SCHAUER  2,244,026
RADIAL DRILL
Filed Dec. 10, 1937  3 Sheets-Sheet 3

INVENTOR
Lawrence Lee Schauer
BY
Albert F. Nathan
ATTORNEY

Patented June 3, 1941

2,244,026

UNITED STATES PATENT OFFICE 2,244,026

RADIAL DRILL

Lawrence Lee Schauer, Wyoming, Ohio, assignor to The Cincinnati Bickford Tool Company, Oakley, Cincinnati, Ohio, a corporation of Ohio Application December 10, 1937, Serial No. 179,058

7 Claims. (Cl. 77—28)

This invention concerns radial drilling machinery and has for its primary object to render available a sturdy compact machine and one suitable for that tremendously large class of work which cannot be efficiently handled on either a standard upright drilling machine or the conventional radial drilling machine.

A further aim of the invention is to provide a commercially practical machine having a range of electively available speed and feed changes most suitable for a given class of work, with provision for inexpensively and conveniently modifying those elective speed changes to afford a different range of speeds appropriate for another class of work.

A further object of the invention is to simplify and improve the spindle drive transmission by a structure utilizing a minimum number of operating parts, so organized and related that each part gives maximum service whenever the machine is in operation, to the end that excess weight of non-continuously used parts are eliminated and a more direct and efficient spindle drive provided.

As an additional refinement, the invention aims to provide a unitary drill head structure having a range of built-in selective spindle speeds so constructed and arranged that a direct coupled motor and changeable back gear unit may be incorporated and by which the built-in speeds may be modified to suit any existing spindle speed requirement.

To further the ends of simplicity and compactness of the spindle drive, and in the machine as a whole, the invention aims to render available a machine in which the spindle back gears are accessible for convenient removal and replacement and to relate the back gear unit with the built-in transmission so that there is but one point of driving contact, and that point occurring between the initial and final power transmitting elements of the two sets. This last mentioned feature, in addition to facilitating the assembling and aligning of the two part head units, lends permanency to the drive between the back gear and the secondary speed change sets, and all speed changes both primary and secondary are accomplished without disturbing that connection. That is to say, the pick-off back gears are adapted to be changed or the selective gears in the main head shifted to different positions, without disturbing the driving connection between the sets or altering the positions of the parts of the other and related transmission mechanisms.

A further object of the invention is to eliminate the factors contributing to vibration and the tendency of the arm to twist under the load of the tool head, by providing a balanced drill head structure and one in which the major moving elements are closely coupled and located relatively close to the plane of the supporting arm and arm guideways.

In the attainment of the objectives of this invention, it is proposed to construct a radial drill having a translatable tool head consisting essentially of two parts, to wit, a main head in which are journaled all the sliding gears and shafting for the selective speed and feed changes, and a back mounted unit in which is housed the pick-off back gears and having provision made for mounting a close coupled direct drive motor. An additional pair of gears, one journaled in the main head, and one journaled in the back unit, are provided for establishing automatically a driving connection between the units upon assembling.

The spindle drive motor being mounted on the drill head close to the arm ways, tends by its mass and location to dampen out vibration and produces a translatable tool head structure that is exceptionally compact, relatively light in weight, and normally in a state of balance on the arm.

Upon entering the main head the power is transmitted first to a jack shaft upon which is mounted a sliding gear unit. This shaft runs normally at a constant speed, and the speed changes produced by the sliding unit affect only the spindle. In this way, varying degrees of momentum and vibration are excluded from the drill head.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 1 is a front view of a radial drill embodying this invention.

Fig. 2 is an end view thereof illustrating more clearly the balanced relation of the parts.

Fig. 3 is a sectional view of the head partly assembled, showing the primary and secondary spindle speed change gear sets and the unit principle of construction.

Figure 4:
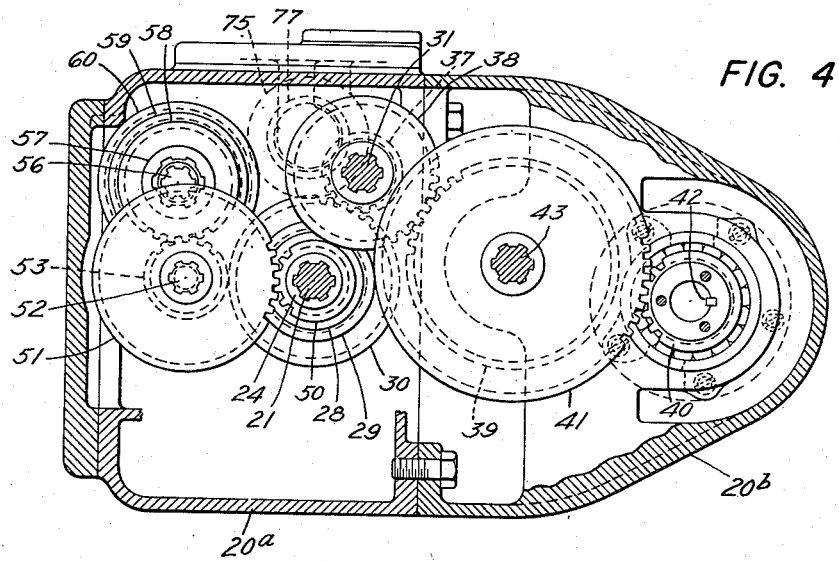
Fig. 4 is a sectional view along lines 4—4 of Fig. 3.

Referring more particularly to Figs. 1 and 2, the radial drill depicted comprises a base member 10 which supports a column 11 at one end. A sleeve 12 rotatably mounted on the column carries for vertical translation thereon, a laterally extending arm 13. The raising and lowering of the arm is effected by means of a stationary screw 14 and a rotatable nut 15. The nut 15 is rotatably but non-translatably journaled in the arm and has splined thereto a bevel gear 15a. A manually operable crank 16, operating through a pinion gear 16a and the gear 15a is provided for rotating the nut, and when the arm is adjusted to the required position it is clamped to the sleeve by the manual clamp means 17. A ball and spring means 15b, between the nut 15 and gear 15a is provided to take the weight of the gear 15a off of the pinion gear 16a. The sleeve, likewise, is adapted to be clamped to the column by means of the hand operated clamp 18.

The laterally extending arm 13 supports on the guideways 19, a shiftable drill head unit 20 which houses a rotatable and translatable spindle 21, and all of the spindle drive and feed mechanisms. The drill head is formed essentially in two parts, namely the main head 20a and a back bracket 20b.

The main head 20a is provided with square guideways 19a which match the ways 19 on the arm, and is also provided with a manually operable head traversing means 19b for shifting the head and spindle laterally along the guides. The clamping mechanism for the head is located preferably at the left side and comprises a lever 90, shaft 91 and draw bolt and plate elements 92 and 93. The shaft 91 is provided with an eccentric 94 that engages the eye of the draw bolt for shifting the bolt axially when the lever is operated. The free end of the draw bolt 92 extends through the clamp plate 93, which is fitted in a recess formed in the head strap 95 carried by the head, and is provided with a nut 96 by means of which proper clamping action on the upper rail guide 19 may be obtained.

Normally the main head tends to tip forwardly, thereby throwing the spindle out of alignment, and sets up twisting forces leading to permanent deflection in the arm itself. In the present arrangement, however, the tipping and twisting forces are substantially entirely eliminated and neutralized by the location and manner of suspension of the drive motor 22 and the back gear unit 20b. Figs. 2 and 3 more clearly illustrate this relation and in which it will be seen that spindle 21 lies in a plane parallel and closely adjacent the arm guideways. The plane of the guideways substantially coincides with the dividing line between the main head 20a and the back drive unit 20b. The unit 20b thus, in effect, forms a back cover for the head 20a, and the relatively thin lower portion 20x thereof affords a base plate and the means for locating the motor footing close to the plane of the arm ways. When the drive unit is attached to the main head, the complete assembled structure "straddles" the arm and the weight on one side is substantially balanced by the weight upon the other and any vibration incident to the motion of the major elements is transmitted directly to the arm ways.

This close coupled arrangement gives rise to problems in the drive gearing and particularly in the present instance wherein it is necessary to keep down the number and weight of the parts and at the same time provide for a wide range of spindle speeds in the confined and restricted space of the radial drill head.

Figure 5:
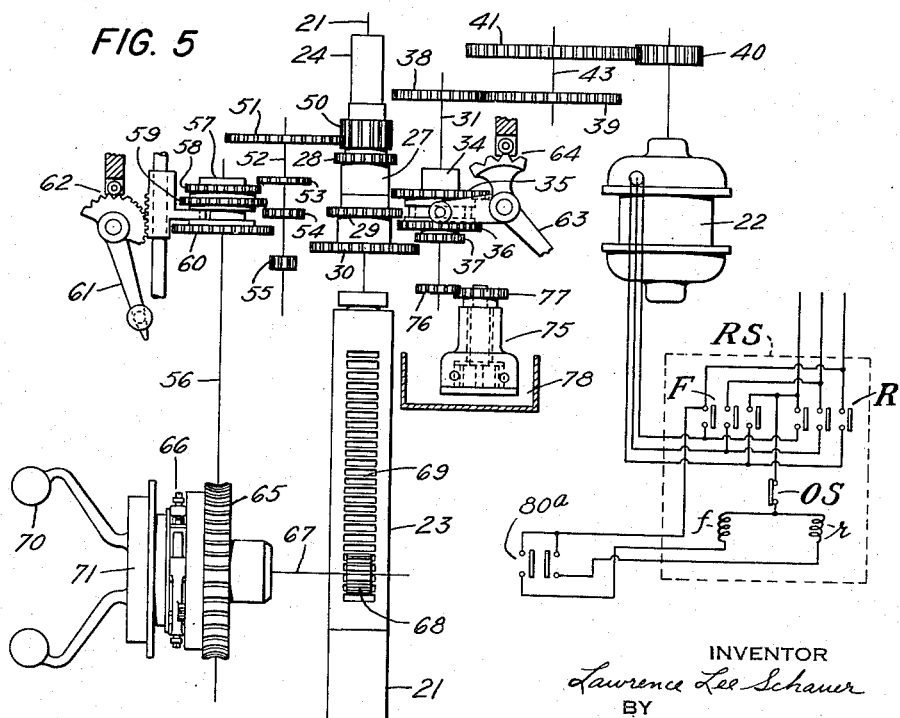
Fig. 5 is a line diagram of a spindle drive and feed gearing in developed form.

With reference to Fig. 3, and the line diagram Fig. 5, the drill spindle 21 of this embodiment, is illustrated journaled in a translatable but non-rotatable sleeve 23. The upper end of the spindle is splined to a non-translatable sleeve 24 journaled in bearings 25, 26 in the main head. The sleeve 24 has keyed thereto a gear unit 27 comprising three spaced gears 28, 29 and 30.

Laterally offset from the spindle, but again closely adjacent the plane of the arm ways, a jack shaft 31 is journaled in spaced bearings 32, 33 in the main head 20a and upon which is slidingly mounted a three gear unit 34. The gears 35, 36, and 37 thereof are proportioned to mesh selectively with the spindle gears, and any one of three different spindle speeds may be obtained thereby.

A gear 38 mounted at the upper end of the jack shaft is the initial gear in the head mounted drive train, and receives power from a gear 39 journaled in the removable drive unit 20b.

The drive unit assembly includes a motor 22, mounted directly to the extended portion 20x of the rear housing, and its direct connection with back gears 40 and 41. The initial gear 40 has a splined sliding connection 42 with the motor shaft, to facilitate assembly, and the gear 41 has a splined but non-sliding connection with a supplemental jack shaft 43. The shaft 43 is journaled in spaced bearings 44 between which the gear 39, which is also keyed to the shaft, operates. An adapter plate 20y may be used when necessary to obtain proper center distance with a particular motor.

Both jack shafts 31 and 43 are so related and the gears 38 and 39 so proportioned, that a drive is established between the main head gearing and the gearing of the drive assembly whenever the assembly is bolted in position on the main head. Complications and problems of alignment are consequentially reduced by this method of driving and assembling two units.

As hereinbefore explained, the drive assembly is removable and houses the back gears of the spindle drive train by means of which the speeds of the secondary and built-in change speed mechanisms of the main head are capable of modification to suit particular needs. The back gears referred to are the gears 40 and 41, which as illustrated are located in the uppermost portion of the bracket 20b, and are in the form of pick-off gears. By removing the top cover plate 45 and the nut 46, the pick-off gears 40 and 41 may be removed and replaced by others to bring about the desired spindle speeds.

This arrangement of pick-off gearing does not, it will be seen, effect the motor mounting or the relation of the connecting gears 38, 39, or any of the parts within the main drill head 20a. The back gears are, so to speak, isolated from the remaining transmission and may be changed at will. Likewise, with the motor 22, its mounting and connection with the back gearing is such that the motor may be removed and replaced by another of a different speed, or by one of dual speeds, without changing the initial set-up, and thus provides a further method of increasing the range of speeds and the general adaptability of the machine.

The starting, stopping, and direction of spindle rotation is conveniently controlled with a lever 80 located at the left side of the head. Within the head, a reversing switch 80ª comprising a normally open "forward" switch and a normally open "reverse" switch, is provided. When both switches are "open" (control lever in neutral) the motor and spindle is stationary, but when the lever is shifted from its neutral position to either of its effective positions the motor and spindle are caused to rotate accordingly. Detent means 80ᵇ are provided for yieldingly maintaining the switch lever in one of its set positions. The motor circuit controlled by the reversing switch 80ª is illustrated in Fig. 5, and includes a solenoid operated master reversing switch RS having built therein a forward switch F, a reversing switch R, and an overload safety switch OS. Solenoids f and r, controlled from the reversing switch 80ª, operate the switches F and R.

The power feed for the spindle, shown more clearly in Figs. 5 and 3, is taken off the spindle at the gear 50, so that the rate of feed will bear a definite relation with spindle rotation, i. e., a definite axial travel per revolution of the spindle. From the spindle gear 50, the power passes to gear 51 on a jack shaft 52 which also is journaled in the main head and has mounted thereon three spaced gears 53, 54, and 55. These gears transmit the power selectively to a feed shaft 56 through the intermediary of a three-gear sliding unit 57 splined on the feed shaft. The gears 58, 59, and 60 of the sliding unit are spaced to mesh selectively with the gears on the jack shaft 52, with intermediate idle positions between each two effective positions, and the whole unit being shiftable and maintained in shifted position by a hand lever mechanism 61 and detent means 62.

In like manner the sliding gear unit of the spindle rotating train is shifted and maintained in shifted position by the change speed lever mechanism 63 and detent means 64.

Through the feed gearing just explained, three different feed rates may be imparted to the feed shaft for any given spindle speed, e. g., coarse, fine, or intermediate. These feed rates are transmitted to the spindle through a worm and worm gear mechanism 65, power feed clutch 66, pinion shaft 67, and feed pinion 68 which meshes with a rack 69 cut on the spindle sleeve 23.

Two levers 70 pivoted to a traverse head 71 located at the front of the main head, operate the power clutch 66, and when the power feed is not used (power clutch disengaged) the levers 70 may be turned angularly to effect translation of the spindle manually in either direction.

All moving parts are kept well lubricated by means of a pump 75 located in the main head and driven from the jack shaft 31 through gears 76, 77. The pump receives lubricant from a reservoir 78 and by a system of aligned conduits and tubing forces the oil to the moving parts in all portions of the main head and back drive units, from whence it drains back to the reservoir for recirculation.

The general operation of the machine is as follows: The operator places the workpiece on the bed 10, or supplemental work table and then adjusts the arm angularly and/or vertically as necessary. The tool head is then shifted laterally on the arm to bring the spindle to the required position over the workpiece. When properly located, the head, arm, and column are clamped firmly in position. The speed and feed levers 63 and 61 are then set for the proper rates and the motor 22 started, in a forward or reverse direction as the case may be, by operating the switch control lever 80. Thereafter, the operator manually propels the running spindle toward the work, but before engaging the work, shifts the levers 70 to engage the power feed clutch. At the end of the tooling operation, the power feed is thrown out, either manually or automatically, and the spindle returned to its upper position ready for a succeeding operation.

For sensitive drilling and tapping operations the power feed clutch will not, ordinarily, be used, and in that event the operator feeds and retracts the spindles by hand, through levers 70, and controls the starting, stopping, and forward, and reverse rotary motions with the lever 80.

In the present arrangement the operator has three selective speeds to choose from, however, if those speed ratios do not fit the particular work at hand he may, with this invention, change the entire range in a moment's time by substituting pick-off gears 40 and 41 of the ratios required to yield the proper range of speeds. For example, if the gearing illustrated in the drawings is that required to give spindle speeds of 2000, 1300, and 500 (using a 1200 R. P. M. motor) which afford a peripheral cutting speed of approximately 80 feet per minute with drills $\frac{3}{32}$, ¼ and ⅝ respectively, an extra set of two pick-off gears, ratioed, to increase or decrease the speeds 20%, will give the user a total of six different spindle speeds. A third set of pick-off gears will give nine speeds, and a fourth set, twelve different speeds, each of which is definitely related to the motor speed of the motor. If a two speed motor is used, the number of speeds available are compounded.

In certain installations a narrow or a wide range of speeds is required, this invention meets all of the requirements by virtue of the accessibility of the change speed pick-off gears and arrangement herein proposed for conveniently mounting and connecting a motor directly to the drill head. The user has with the aid of this invention a very sensitive, simplified machine incorporating a greater range of flexibility, utility and capacity than was ever possible heretofore.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A change speed mechanism for the spindle of a drilling machine comprising a main head member, a tool spindle rotatably and translatably journaled therein; a change speed transmission also journaled in said main head and operatively connectable to rotate the spindle at any one of three different speeds, an auxiliary head connected to a lateral side of said main head, a second speed change transmission journaled in said auxiliary head and arranged to drive the change speed mechanism of the main head at any one of a plurality of different speeds, said two change speed transmissions thereby being in series relation with each other and affording a multiplicity of different spindle speeds, and means journaling the initial gear of the transmission of the main head and the final gear of the transmission of the auxiliary head in substantially the same plane and at properly related center distances in their respective heads whereby a driving relation between the said two transmissions is established upon the assembling of the said two heads together.

2. A change speed mechanism for the spindle of a drilling machine comprising a main head member and a laterally removable secondary head member, a tool spindle rotatably journaled in the main head therein; a spindle driving gear also journaled in said main head and operatively connectable to the spindle to rotate the spindle, a speed change transmission supported wholly by said secondary head and arranged to drive the said gear of the main head at any one of a plurality of different speeds, said change speed transmission including a driving motor, a set of change gears, and a final gear, and means journaling the said spindle driving gear in the main head and the said final gear in the secondary head in position establishing a changeable speed power drive from the motor to the spindle upon the assembling of the said two heads together.

3. A change speed mechanism for the spindle of a drilling machine comprising a main head member, a tool spindle rotatably and translatably journaled therein; a change speed transmission also journaled in said main head and operatively connectable to rotate the spindle at any one of a number of different speeds, an auxiliary head connected to a lateral side of said main head, a second speed change transmission journaled in said auxiliary head and arranged to drive the change speed mechanism of the main head at any one of a plurality of different speeds, a terminal gear in each of said heads for establishing a power drive in series relation between the change speed mechanisms of each head; and means journaling the said terminal gears of the respective transmissions in their respective heads in position to be freely separable from each other upon the removal of the auxiliary head in a lateral direction.

4. A change speed mechanism for the spindle of a drilling machine comprising a main housing, a spindle rotatably journaled therein, a shaft paralleling the spindle also journaled in the said housing, said shaft having an initial gear fixed thereon and one or more sliding gears, complemental gears on said spindle arranged to be driven by selected ones of said sliding gears, a secondary housing normally attached in fixed relation to said main housing, a change speed mechanism journaled wholly in said secondary housing comprising a power input shaft and a power output shaft and change speed gearing therebetween, a terminal gear on said output shaft arranged to mesh with the said initial gear of the first named transmission when said two housings are assembled together, said initial and terminal gears being laterally separable and affording the sole power connection between the said two transmissions.

5. A change speed mechanism for the spindle of a drilling machine combining a main housing, a spindle rotatably journaled therein, a shaft paralleling the spindle also journaled in the said housing, said shaft having an initial gear fixed thereon and one or more change speed gears, complemental change speed gears between said shaft and the spindle operable to effect a plurality of different spindle speeds; a secondary housing normally attached in fixed relation to said main housing, a power drive means supported wholly by said secondary housing including a motor underlying the secondary housing, a power input shaft and a power output shaft, a terminal gear on said output shaft arranged to mesh with the said initial gear of the said transmission when said two housings are assembled together, said initial and terminal gears affording the sole power drive connection between the elements of said two housings and being freely separable in a lateral direction upon the separation of said two housings.

6. A change speed mechanism for the spindle of a drilling machine comprising a main housing, a spindle rotatably journaled therein, a change speed mechanism also journaled in the said housing, including an initial gear; a laterally removable driving unit normally attached in fixed relation to said main housing, comprising a detachable motor, a hollow power input shaft arranged to receive the shaft of the motor and a power output shaft; a terminal gear on said output shaft arranged to mesh with the said initial gear of the said change speed mechanism when said driving unit is assembled on said main housing, said initial and terminal gears affording the sole power connection between the change speed mechanism of the main housing and said driving unit and which remains unaffected despite a change in motors.

7. A drilling machine combining a two part drill head; a power transmission including a motor, a change speed mechanism and a final gear driven thereby supported wholly by one of said drill head parts, said final gear having a portion on its toothed periphery projecting outwardly from the plane of the joining face of its related drill head part and into the other of said parts; a tool spindle rotatably journaled in the other of said parts, a driving transmission therefor including a shaft and speed change mechanism between the said shaft and the spindle, an initial power transmitting gear on said shaft located in a position to be meshed and driven by the said final gear when the said parts of the drill head are brought together, said final and initial gears thereby establishing a series relation between the said two speed change mechanisms whereby the total number of individual spindle speeds is the product of the number of speed changes effected by the said speed change mechanism in each of the two parts of the drill head.

LAWRENCE LEE SCHAUER.